(12) United States Patent
Röthe et al.

(10) Patent No.: US 6,834,420 B1
(45) Date of Patent: Dec. 28, 2004

(54) DEVICE FOR PRODUCING A RIVETED JOINT AND CORRESPONDING RIVET

(75) Inventors: Sven Röthe, Lutherstadt Wittenberg (DE); Klaus Wirth, Tettnang (DE)

(73) Assignee: Wirth GmbH, Landsberg (DE)

( * ) Notice: Subject to any disclaimer, the term of this patent is extended or adjusted under 35 U.S.C. 154(b) by 0 days.

(21) Appl. No.: 09/719,009

(22) PCT Filed: Jun. 4, 1999

(86) PCT No.: PCT/EP99/03862

§ 371 (c)(1),
(2), (4) Date: Dec. 7, 2000

(87) PCT Pub. No.: WO99/65629

PCT Pub. Date: Dec. 23, 1999

(30) Foreign Application Priority Data

Jun. 12, 1998 (DE) .......................................... 198 26 157

(51) Int. Cl.[7] .......................... B21J 15/26; F16B 13/04; F16B 19/08
(52) U.S. Cl. ................. 29/243.526; 72/391.8; 411/29; 411/43
(58) Field of Search ............................. 72/114, 391.8; 29/243.521, 243.526; 411/29, 43

(56) References Cited

U.S. PATENT DOCUMENTS

| | | | |
|---|---|---|---|
| 3,691,924 A | | 9/1972 | Baker |
| 4,990,042 A | * | 2/1991 | Szayer et al. .................. 411/29 |
| 5,511,298 A | * | 4/1996 | Gasser .................. 29/243.526 |

FOREIGN PATENT DOCUMENTS

| | | | |
|---|---|---|---|
| DE | 23 24 385 | | 1/1975 |
| DE | 2334385 | * | 1/1975 |
| DE | 295 14 392 U1 | | 11/1995 |
| DE | 29514392 U1 | * | 12/1995 |
| DE | 19652031 A1 | * | 6/1998 |
| GB | 1128442 | * | 9/1968 |
| WO | 95/05255 | * | 2/1995 |

* cited by examiner

*Primary Examiner*—David Jones (57) ABSTRACT

A device for producing a riveted joint includes a mechanism (21, 25) to fire a rivet (14) having a jacket (14a) and a pin (14b) guided through the jacket (14a). The rivet is fired through the workpieces to be joined. A means is provided for pulling the rivet (14). The device that can be manufactured at a reasonable price and ensures reliable operation by the mechanism (21, 25) for firing the rivet (14) acting upon the rivet pin (14b).

19 Claims, 4 Drawing Sheets

DEVICE FOR PRODUCING A RIVETED JOINT AND CORRESPONDING RIVET

BACKGROUND OF THE INVENTION

Riveted joints are already known and used for the joining of workpieces, especially sheets of metal, and particularly when the workpieces to be joined are accessible from only one side. Typical uses of the riveted joint are the assembly of metal fittings, walls of cassettes or disk holders or border parts on insulation panels in industry and in the construction of large halls or gymnasiums. The sheet metal pieces to be joined are of a thickness of approximately 0.1 mm to approximately 3 mm, and of typically approximately 0.75 mm.

For the mounting of the rivet, made up of a rivet jacket and a rivet pin guided through the rivet jacket, the workpieces are first penetrated through a bore hole in the workpieces. The rivet with rivet jacket is pressed forward and through as far as impact of the striking head of the rivet jacket on the edge of the borehole. For production of the riveted joint between the workpieces then with holding back of the striking head, the rivet pin is drawn counter to the pressing-in direction. The end of the rivet jacket lying opposite the striking head is thereby deformed, allowing for the formation of a widened out part, so that the workpieces to be joined together are held together between the striking head and the widening out which has been produced.

This type of rivet is frequently also called a "blind rivet". EP 0 302 128 B1 discloses a tool for the pulling or setting of blind rivets. For use of such tool, a preliminary borehole and insertion of the blind rivet are still required.

WO 95/05255 discloses a device for production of a riveted joint with pneumatically driven means for the filing of a rivet through the workpieces to be joined and pneumatically driven means for the subsequent pulling of the rivet. The means for the firing of the rivet in this case incorporate a conically tapering, hollow cylindrical driving-in part on the striking head of the rivet jacket. The rivet pin is guided through an opening in the striking surface of the driving-in part which is turned toward the striking head of the rivet in the interior of the driving-in part, and at that pint is picked up by the means arranged to the rear of the driving-in part in the firing direction for the pulling of the rivet. The outlay for construction required by the arrangement of the means for the pulling of the rivet within the hollow cylindrical volume formed by the means for the firing of the rivet is considerable for such a device, especially because it requires the maintenance of small manufacturing tolerances for the means for pulling the rivet. Also, this arrangement requires a large structure for the entire assembly.

GB-A-1,128,442 discloses a device for producing a riveted joint with means for the driving of a rivet having a rivet jacket and a rivet pin guided through the rivet jacket through workpieces to be joined and with means for the pulling of the rivet. The means for the driving-in of the rivet act on the rivet pin, and have a firing bolt in a cylindrical part and a cylindrical striking member arranged between the rivet and the firing bolt, which has a shoulder on which the firing bolt impacts. During insertion into the device, the rivet with its rivet pin is guided in insufficiently far to form contact on a contact strip of the striking member and/or through the manipulation of the device. The movements of the rivet pin connected with the device is moved away from the contact strip. During the driving-in process, an impact of the striking member occurs on the rivet pin. This impact frequently leads to an undesired deformation of the rivet pin and/or to damage of the striking member.

DE 295 14 392 U1 discloses a rivet in which the rivet jacket is stopped on the rivet pin. Especially, the rivet jacket is stopped between convexities constructed between the rivet pin and the rivet head. The rivet pin has a conical point on its first end turned toward the workpieces. With driving in of such rivet, the driving-in force is exerted on the rivet jacket. Using such rivet with the disclosed device in which the means for the driving-in of the rivet work on the rivet pin, the rivet pin is forced through the rivet jacket, whereupon no riveted joint can be produced.

SUMMARY OF THE INVENTION

Objects of the present invention are to provide a device for producing a riveted joint which overcomes the drawbacks of conventional devices and which prevents the deformation of the rivet pin and/or of the striking member, and thus, provides a higher level of operational security and a longer life of the device.

Other objects of the present invention are to provide such device to be produced at low cost and guaranteeing reliable operation. The outlay for the construction for the preparation of the means for the pulling and means for the firing of the rivet is thus to be as small as possible, and especially with as small as possible structural dimensions. Also, a rivet which can be processed using this device is to be prepared for use.

The foregoing objects are basically obtained by a device where its striking member is held in axial contact on the rivet pin in the cylindrical part by a flexible element, especially by a first helical spring. This arrangement provides the advantage that the striking member already engages on the rivet pin when the firing bolt impacts on the striking member. Thus, any damage, particularly bending, of the rivet pin and of the striking member is reliably prevented on the basis of an impacting of the striking member on the rivet pin. Furthermore, a dropping of the torn-off rivet pin into the firing channel is prevented. The device can be operated in any position. Particularly, rivets can even be arranged facing vertically upward.

Since the means for the driving-in or firing of the rivet act on the rivet pin, the means for the pulling of the rivet can advantageously engage in the firing direction before the means for the firing of the rivet on the rivet pin. The constructive configuration of space allowed for the realization of the means for pulling the rivet is thus greater, and a corresponding device of small dimensions can be easily realized. The firing of the rivet with acting upon the rivet pin then increases the reliability of the riveted joint being produced, since a certain penetration of the workpieces to be joined is guaranteed by means of the rivet pin. The means for the firing and means for the pulling of the rivet can be powered pneumatically, hydraulically, magnetically, electrically, piezoelectrically or with use of some means of explosion.

By the "interposition" of a cylindrical striking member between the firing bolt and the rivet, the reliability of the firing process, and with that the reliability of the riveted joint itself, is heightened. The striking member can then be made up of a first segment with diameter adapted to the diameter of the firing channel and a second segment with smaller diameter adapted to the diameter of the rivet pin. Particularly, the second segment can be of approximately identical diameter up to 1.5-times the diameter of the rivet pin.

The reliability of the firing process is even further heightened by having the centering device adapted to the trough-like or depressed shape of the end of the rivet pin which is adjacent to the striking member. Of particular importance, the traditionally desirable rectangular alignment of the rivet pin in relation to the workpieces to be joined and the corresponding guiding of the rivet during the firing process is guaranteed.

The movement of the striking member at the end of the firing process is smoothly suppressed by the flexible buffer element and especially does not impinge on the end of the preferably metallic firing channel. The service life of the device is thus significantly increased. The buffer element engages preferably on an annular shoulder at the end of the firing channel, which is formed by an opening in the firing channel. For example, the buffer element can be a helical spring, disk spring or rubber or plastic washer.

The firing channel can be made easily accessible as a result of the two-part configuration of the firing channel being formed by a hollow piston and a connecting member which preferably are screwed together. In that case, the striking member can be exchanged when necessary.

The guiding of the rivet pin during the firing and pulling process can be obtained through the end piece. Also, the end piece simultaneously executes a spreading of the clamping jaws during the firing process. Such action allows a friction-free passage of the rivet pin and, if necessary, of the striking member through the clamping jaws during the firing process. Any damage to the clamping jaws and potentially to the striking member is simultaneously and reliably prevented by the rivet pin during the firing process. Also, the introduction of a new rivet is simplified by the spreading of the clamping jaws. The second flexible element can be configured as a helical spring. Alternatively, for example, a disk spring or a rubber or plastic washer can be used.

The piston, joining member and clamp sheathing can be connected with one another, preferably by being screwed together with one another. A pulling of the rivet pin by means of the stress of the pressure of the piston counter to the force effect of a flexible element, preferably a helical spring with high elasticity constant, a reliable pulling of the rivet, and with that a reliable production of the riveted joint, are then guaranteed. The pressure is preferably applied by using hydraulic pressure in order to generate the required high pressure forces.

The device can require only one auxiliary connection, in the form of a compressed air connection. The hydraulic pressure is generated through a pneumatic/hydraulic pressure converter. The rivet is fired pneumatically. The rivet is pulled hydraulically. The entire riveting process including firing and pulling is controlled by a three-stage pneumatic switch element. The pneumatic/hydraulic pressure converter, the same as the rapid evacuation valve, is preferably mounted in a handle of the device.

A rivet can be provided for use in the device according to the present invention. With the pyramid-shaped point of the rivet pin, for example, four cutting edges are formed and simplify penetration of the workpieces. By the provision of catch means directed toward the point of the rivet, any relative movement of the rivet relative to the rivet jacket, especially during the firing process of the rivet, is reliably prevented. The catching means could, for example, be realized by pins projecting radially and distributed around the periphery of the rivet pin, or by truncated conical partial segments of the rivet pin produced by rollers and arranged in axial alignment one behind the other.

Since the rivet jacket is connected tightly with the rivet pin, and preferably is extruded thereon, the rivet pin will not be moved, or at least will not be moved remarkably relative to the rivet jacket during the firing process with use of the rivet in a device according to the present invention. With the device according to the present invention, the means for firing the rivet act on the rivet pin. The rivet pin is preferably of steel or stainless steel. The rivet jacket can likewise be of steel or stainless steel, or alternatively of an aluminum or copper alloy. Upon deformation of the pint, penetration of the workpieces is still possible even when using low firing energy. The point can be configured conical or, if desired, can be ogival. Especially the point can also have one or more cutting edges. The point angle is preferably configured in a range of 30 to 60°.

The cooperation with the centering device on the striking member is specifically guaranteed by the tapering second end of the rivet pin. A configuration of the second end in the shape of a pyramid is advantageously obtained by suitable separation of a rivet pin from a rod-shaped starting material.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
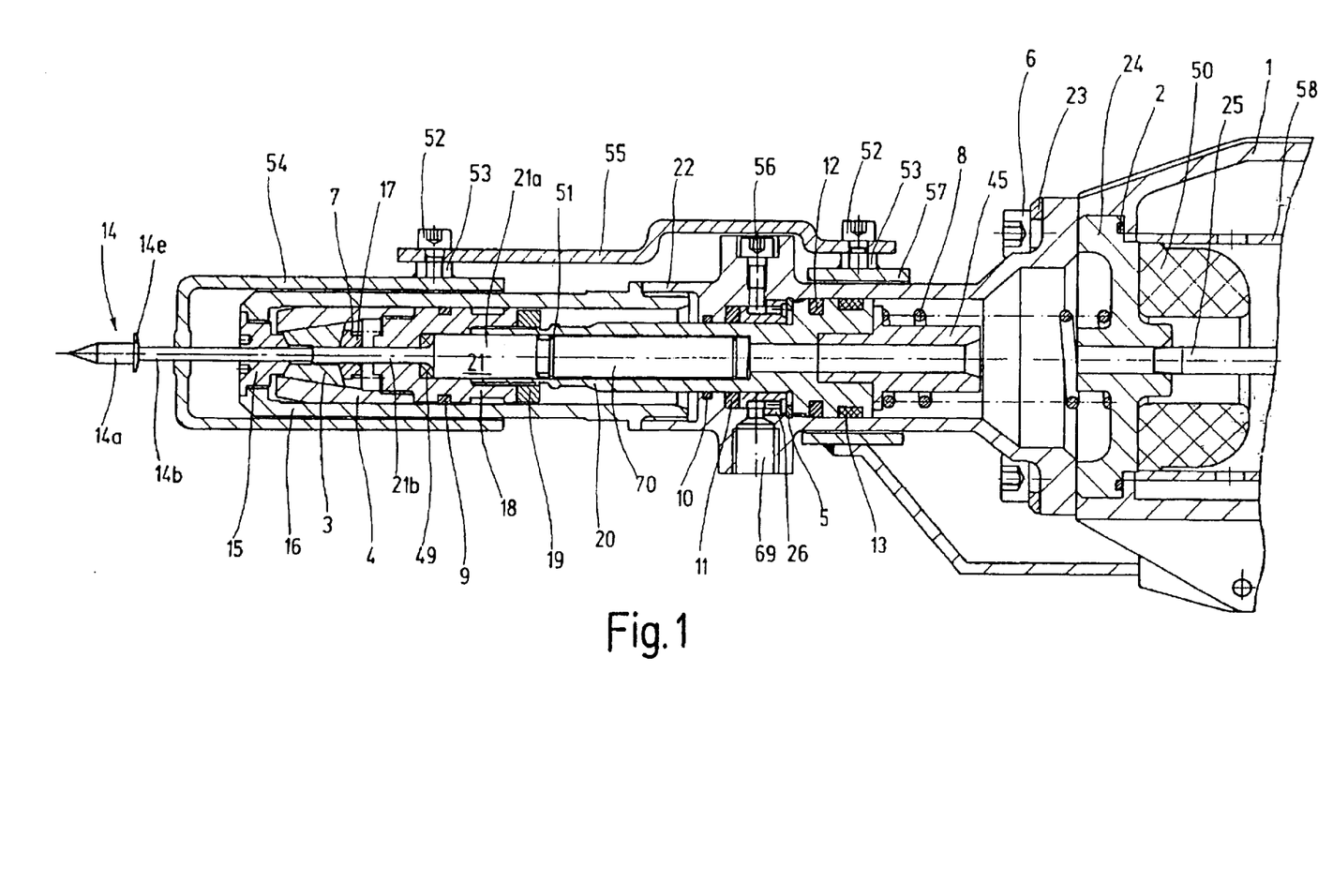
FIG. 1 is a side elevational view in section of a head part of a device according to an embodiment of the present invention.

FIG. 1 shows a section through the head part of the device, according to the present invention, for the firing and pulling of the rivet. The housing 1 of the device is represented at the right edge of the drawing. By a first packing O-ring 2 and a glass shield 24, the first cylinder 22 is screwed on the housing with cylindrical screw 6 and supporting disks or washers 23. On the right edge of the drawing, pneumatic cylinder 58 with the firing bolt 25 and the first buffer 50 is illustrated. Firing channel 70 extends in axial extension of firing bolt 25, and is formed by the centering member 45, the hollow piston 20 and the joining member 18. Piston 20 is screwed together with joining member 18, and is connected with the centering member 45 by a close adaptation of the play and under the effect of force from the third helical spring 8, forming the third flexible element. Piston 20 is supported by third helical spring 8. Spring 8 is supported at one end on the glass shield 24 and on the other end on centering member 45 and is prebiased in the direction of the rivet 14 illustrated at the left edge of the drawing.

Piston 20 is guided in first cylinder 22 by a guiding ring 13 and a first packing/sealing combination 12 and is sealed. Via hydraulic connection 69, hydraulic power fluid is guided through an annular groove and corresponding bores into the first guide bushing 26 on a retaining ring 5 and into the hollow cylindrical volume between first cylinder 22 and piston 20. Piston 20 can be moved with corresponding pressure of, for example, 200 Bar counter to effect of third helical spring 8 in first cylinder 22. Another hydraulic connection of first cylinder 22 is plugged blind by the first screw 56. Piston 20 is guided and sealed by a second seal-forming combination 11 and a third O-ring 10 arranged axially adjacent to that arrangement on the rivet-side end of first cylinder 22. The seal-forming combinations 11, 12, 35 are of multiple parts and have a plastic part with a packing washer and a O-ring mounted thereunder.

Piston 20 is screwed together with the joining member 18 with use of a locknut 19. Firing channel 70 is formed by aligned boreholes in piston 20 and joining member 18, and receives a striking member 21. Striking member 21 is prebiased in the direction of rivet 14 by the first helical spring 51 embodied as first flexible element. First helical spring 51 is supported in the direction of housing 1 on an annular shoulder formed in the firing channel by piston 20, and is supported in the direction of rivet 14 on striking member 21. Striking member 21 at its end turned toward first helical spring 51 likewise has an annular shoulder, formed by building up of a cylindrical extension with a small diameter, on which is supported first helical spring 51.

Striking member 21 can be configured of one or more pieces, especially of two pieces. In the case of a two-piece configuration, striking member 21 can comprise a jacket and a pin introduced into the jacket and connected securely with it. The pin has a smaller diameter, a greater length and a higher flexibility module and/or a greater hardness than the jacket. The secure connection between jacket and pin can be executed, for example, by welding, extrusion or by use of adhesive. The diameter of the jacket is adapted to the diameter of firing channel 70, while the diameter of the pin is adapted to the diameter of the rivet pin 14b.

In the position shown in the drawing, striking member 21 engages a buffer element 49 arranged at the end of firing channel 70. Firing channel 70 is open through a borehole in joining member 18 to rivet 14. In the exemplary embodiment shown in the drawing, the striking member 21 has a first segment 21a with a diameter adapted to the diameter of firing channel 70 and guiding striking member 21 in firing channel 70. Also, the striking member 21 has a second segment 21b with smaller diameter adapted to the diameter of the bore in joining member 18 or to the diameter of rivet pin 14b.

Joining member 18 is sealed in and guided within a guiding jacket or sleeve 16. Guiding jacket 16 is screwed together with first cylinder 22, with a second O-ring 9 inserted in an annular groove in the joining member. A clamp sheathing 4 is screwed together with joining member 18. Clamp sheathing 4 surrounds clamping jaws 3 arranged around rivet pin 14b, and is received in the guiding sleeve 16. Clamping jaws 3 are spread at their end turned toward housing 1 by means of a pressure sheathing 17. Sheathing 17 is prebiased under the effect of a second helical spring 7 arranged between pressure sheathing 17 and joining member 18 in the direction of rivet 14. At its end turned toward rivet 14, jaws 3 are spread apart by an end piece 15 screwed into guiding jacket 16. The spreading then is executed by form-locking contact of conical contact surfaces of clamping jaws 3 and pressure sheathing 17 or end piece 15.

Second segment 21b of the striking member 21 projects into the position represented in FIG. 1 through the bore of joining member 18 and a bore in pressure sheathing 17 until it reaches between clamping jaws 3 and engages rivet pin 14b of rivet 14. At its end adjacent to rivet pin 14b, second segment 21b is shaped in a synclinal depression serving as centering device for rivet pin 14b.

Guiding sleeve 16 is surrounded by a centering sleeve 54 having an opening in alignment with the borehole in end piece 15 to receive rivet pin 14b. Centering sleeve 54 has a nut 53 tightly connected thereto, preferably by welding. A second rod 57 also has a nut 53 tightly connected thereto, preferably by welding. First screws 52 are threadly received in nuts 54 to couple centering sleeve 54 to the first rod 55 and to connect first rod 55 to second rod 57. Rod 57 acts on a switch element of the device in such that the firing process cannot be triggered until the centering sleeve 54 is moved by a suitable contact force on the device with contact of rivet 14 to the workpieces to be joined. The contact force moves centering sleeve 54 axially in the direction of housing 1 on guiding sleeve 16. The risk of injury by firing of a rivet without suitable contact on a workpiece and by blank firing and the risk of damage to the device connected therewith are effectively minimized.

Figure 2:
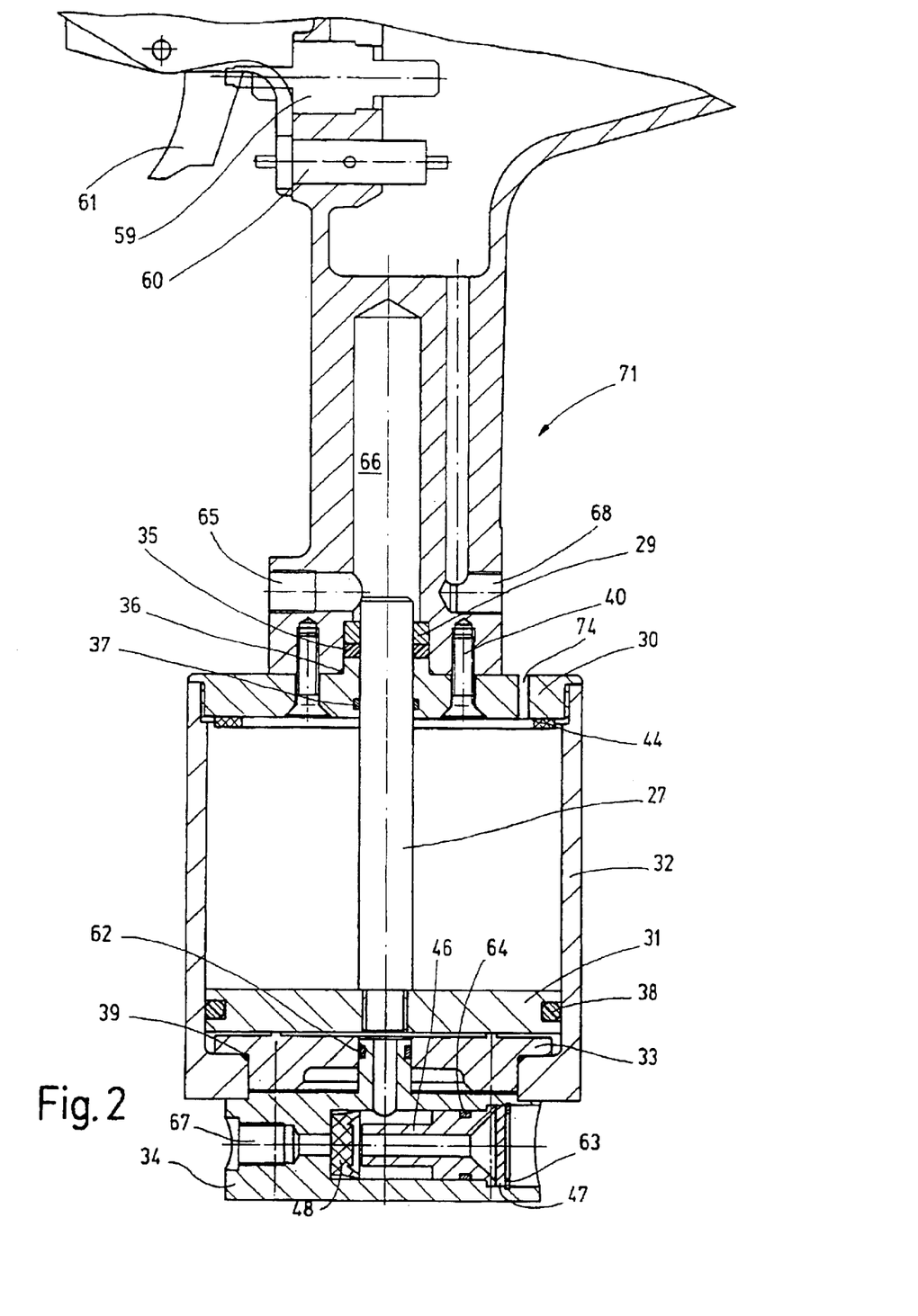
FIG. 2 is a side elevational view in section of a handle of the device of FIG. 1.

FIG. 2 shows a section through the handle 71 of the device of the present invention. Compressed air connection 68 supplies the device with compressed air, for example, at 7 Bar pressure. The process of firing and pulling is controlled by a pneumatic switch element surrounding the firing valve 59, pulling valve 60 and outlet 61. The active pneumatic/hydraulic pressure converter during the pulling of the rivet is triggered with compressed air by a connection (not shown) between pulling valve 60 and input connection 67 in the covering 34. That connection can, for example, be realized through compressed air tubes guided outside of the handle or by compressed air tubes or compressed air channels guided within the handle.

Covering 34 furthermore surrounds a rapid evacuation valve. The rapid evacuation valve includes a sliding seal 48, and a member 46 sealed by a ninth O-ring 64 and having an axial borehole. On the output side of the rapid evacuation valve, a screen 47 is secured with a second security ring 63 to prevent contamination of the rapid evacuation valve. Connection of the rapid evacuation valve with the second cylinder 32 of the pneumatic/hydraulic pressure converter is provided through a borehole in covering 34. Covering 34 is connected, with use of a sealing flange 33 screwed together with it and seventh and eighth O-rings 39 and 62, to the second cylinder 32.

Within second cylinder 32, a pneumatic piston 31 is arranged and is sealed off from the wall of second cylinder 32 by a sixth O-ring 38 introduced into an annular groove in piston 31. A piston rod 27 is connected with pneumatic piston 31. With use of a third sealing combination 35 and a fifth O-ring 37, piston rod 27 moves through a flange 30 and enters into a hollow space 66 filled with a hydraulic fluid. Piston rod 27 is also guided by a guiding bushing 29 arranged between guiding flange 30 and handle 71. With an upward movement of pneumatic piston 31 and the piston rod 27, the pneumatic pressure at the input connection 67 is converted into hydraulic pressure in hollow space 66. The hydraulic pressure is guided through output connection 65 to the hydraulic connection 69 shown in FIG. 1. The pressure guide (not shown) on the hydraulic side can in turn, for example, be guided by pressure lines from outside the handle or the device can be realized by pressure lines or pressure channels guided within the device.

Guided flange 30 is screwed by means of the second screw 40 together with handle 71 with use of a fourth O-ring 36 and sealed tightly. By means of exterior threading, flange 30 is screwed together with the second cylinder 32. An annular second buffer 44 is provided on flange 30 for the buffering of pneumatic piston 31 in the case of an upward movement.

The following functions take place during the production of a riveted joint. First, as shown in FIG. 1, a rivet is introduced into the device until rivet pin 14b engages striking member 21. In this state, the firing process has not yet been triggered, since the centering sleeve 54 in the position shown in FIG. 1 does not yet release or disengage from the pneumatic switch element 59, 60, 61. When the device having rivet pin 14b is pressed against the workpiece to be joined, rivet pin 14b is first introduced counter to the effect of the first helical spring 51 by the clamping jaws 3 in the opening of joining member 18, and the striking member 21 is pressed to the rear in firing channel 70. The striking head 14e of rivet sleeve 14a then comes into contact with centering sleeve 54 and moves this sleeve with further pressing in the direction of guiding sleeve 16, whereupon the pneumatic switch element 59, 60, 61 is disengaged by the first and second rods 55, 57.

During the operation of the first switch step, firing bolt 25 is slipped forward by centrifugal action and impacts on striking member 21, which then acts on rivet pin 14b and fires rivet 14 into the workpieces to be joined. The forward movement of striking member 21 is then buffered by the buffer element 49 within firing channel 70.

With further pulling through of the outlet 61 shown in FIG. 2, by means of the pulling-valve 60, the pneumatic/hydraulic pressure converter is acted upon with compressed air coming through input connection 67. The seal 48 thus engages on insert member 46 and frees the passage of compressed air on pneumatic piston 31, which is moved upward and builds up a pressure in the hollow space 66 over piston rod 27. The hydraulic pressure is fed through the output connection 65 to hydraulic connection 69 shown in FIG. 1.

The hydraulic pressure works on piston 20 and presses it counter to the force of third helical spring 8 in the direction of housing 1. Thus clamp sheathing 4 is also pulled in the direction of housing 1 and clamping jaws 3 engage rivet pin 14b tightly and tear it rearward to a predetermined break point. With release of outlet 61, the input connection 67 shown in FIG. 2 is without pressure, whereupon the seal 48 of member 46 drops away and the passage for the compressed air is released from second cylinder 32 through member 46 and screen 47 leading to the outside environment. Second cylinder 32 is then without pressure. Under the effect of third helical spring 8, piston 20 is then moved its original setting in the direction of rivet 14. Through hydraulic connection 69 and output connection 65, piston rod 27 and pneumatic piston 31 are moved back into their bottom original positions. Simultaneously, by the movement of piston 20 in the direction of rivet 14 by means of second segment 21b of striking member 21, the torn away rivet pin 14b is thrown out forward by clamp sheathing 4 and guiding sleeve 16. The device is now ready for the insertion of another rivet and for the repeated production of a riveted joint.

The mechanism of pneumatic switch elements 59, 60, 61 and of second rod 57 arranged in working connection with the switch is designed so that firing bolt 25, following an act of firing, preferably returns to its original setting and multiple triggerings of the pulling process without cyclical firing processes is possible, as long as the machine has not been removed form the workpieces to be joined. This operation advantageously allows for multiple pullings of a rivet which has been fired in, and therefore, increases both the reliability and the operational security of the device.

Figure 3:
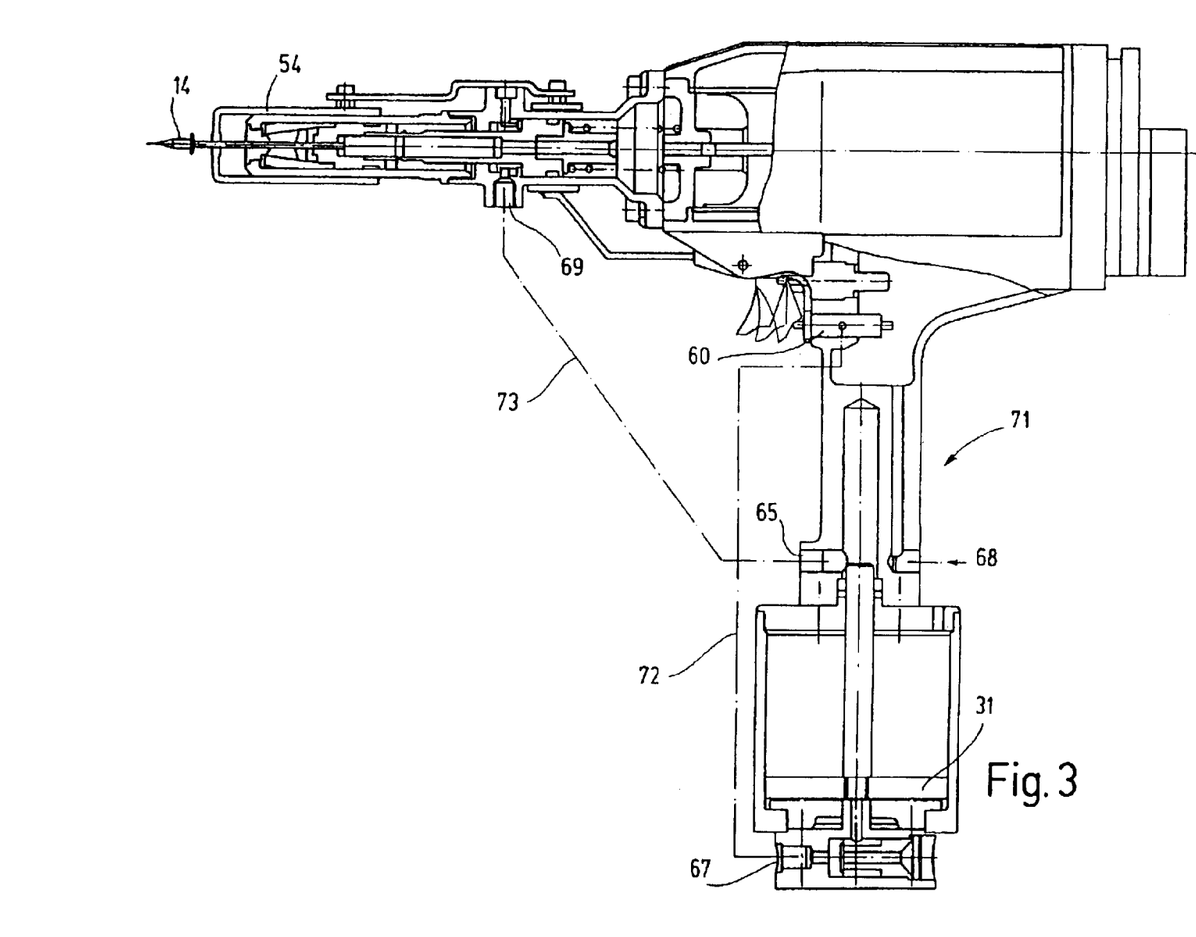
FIG. 3 is a side elevational view, partially cut away of the entire device of FIG. 1.

FIG. 3 shows a diagrammatic and partially sectioned total view of the device of the present invention. The position of rivet 14 relative to centering sleeve 54 and on the head of the device corresponds to the representation of FIG. 1. The position of pneumatic piston 31 in handle 71 corresponds to the representation in FIG. 2. The compressed air conduit 72 is represented by a broken line between the pulling valve 60 and the input connection 67. The hydraulic pressure line 73 is represented by a broken line between output connection 65 and hydraulic connection 69.

Figure 4:
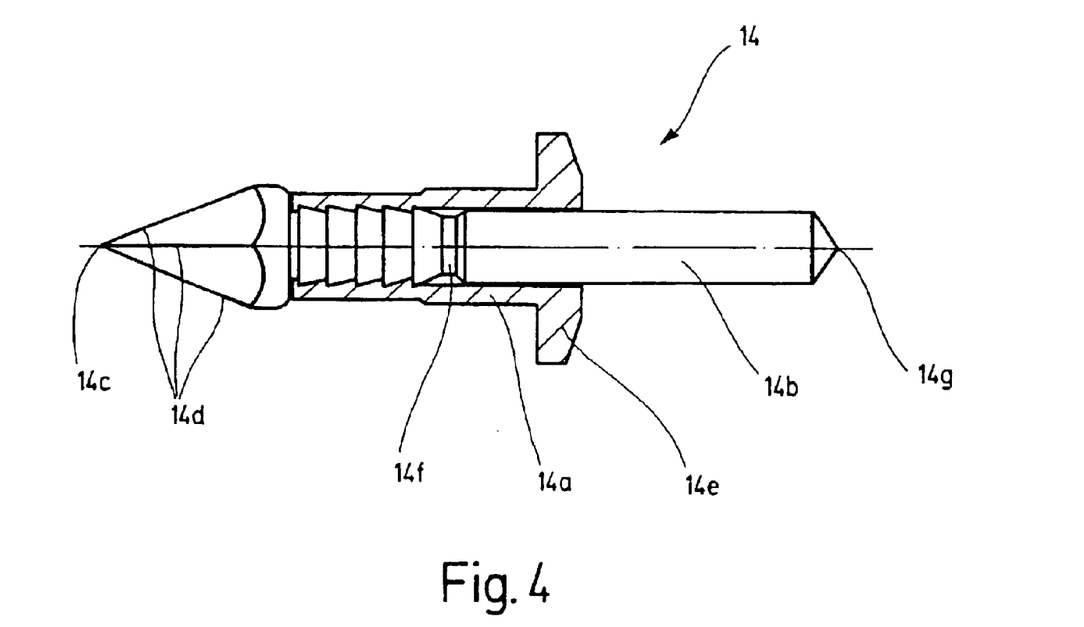
FIG. 4 is a side elevational view in section of a rivet for use in the device of FIG. 1.

FIG. 4 shows a rivet for use in the device of the invention. Rivet 14 is constructed in two parts, a rivet jacket 14a and a rivet pin 14b. Rivet pin 14b is provided at its first end directed to the workpieces to be joined with a point 14c and with cutting edges 14d. The pyramid shape of the first end of rivet pin 14b is especially advantageous, whereupon all four cutting edges 14d are formed. Rivet pin 14b is surrounded in segments by rivet jacket 14a, whereby rivet jacket 14a on its end more distant from point 14c is configured as mushroom-shaped and forms a striking head 14e. At the end 14g opposite this point 14c, rivet pin 14b is likewise configured preferably in pyramid shape, in order to guarantee reliable centering in relation to the striking member 21.

With the firing of rivet 14, rivet pin 14b together with rivet jacket 14a is driven sufficiently far into the workpieces to be joined until striking head 14e engages on the surface of one workpiece. To prevent penetration of rivet pin 14b, rivet pin 14b has catching means in the area of rivet jacket 14a directed in the direction of the point 14c of rivet 14. These means can, for example, be formed by saw-toothed, rolled-in annular grooves. The sawtooth shape is aligned so that during the firing of rivet 14 rivet pin 14b hooks into the rivet jacket. In the area of this catching means, rivet jacket 14a is connected tightly with rivet pin 14b, for example is extruded, soldered, cemented or welded with it. Therefore rivet pin 14b in the area of rivet jacket 14a has a predetermined break pint 14f, from which rivet pin 14b tears away during pulling of rivet 14.

While one embodiment has been chosen to illustrate the invention, it will be understood by those skilled in the art that various changes and modifications can be made therein without departing from the scope of the invention as defined in the appended claims.

What is claimed is:

1. A device for producing a riveted joint with a rivet having a rivet jacket and a rivet pin received within the rivet jacket, comprising:

means for driving the rivet through workpieces to be joined including a cylindrical part with a firing channel, including a firing bolt receivable in said firing channel and including a cylindrical striking member arranged between the rivet and said firing bolt and impacted by said firing bolt;

a first flexible element in said cylindrical part biasing said striking member against the rivet pin;

a piston and a joining member coupled to said piston forming said cylindrical part, said piston and said joining member having aligned boreholes; and means for pulling the rivet in the device.

2. A device according to claim 1 wherein said first flexible element is a helical spring.

3. A device according to claim 1 wherein
said striking member comprises a centering device for the rivet pin on an end of said striking member facing the rivet.

4. A device according to claim 1 wherein
a flexible buffer element is arranged at an end of said cylindrical part facing the rivet to buffer movements of said striking member when the rivet is driven through the workpieces.

5. A device according to claim 1 wherein
said means for pulling the rivet comprises a clamp sheathing connected to said joining member, clamping jaws surrounded by said joining member and arranged around the rivet pin, a guiding sleeve receiving said clamp sheathing and said joining member, an end piece in an axial end of said guiding sleeve facing the rivet and having a borehole in a center thereof receiving the rivet pin, and a second flexible element biasing said end piece to engage and spread said clamping jaws before and during the rivet being driven through the workpieces.

6. A device according to claim 5 wherein
a cylinder is connected to said guiding sleeve, said piston being movable in said cylinder in a pulling direction opposite to a direction of driving the rivet through the workpieces during pulling of the rivet;
a third flexible element biases said piston in a direction opposite to said pulling direction; and
pressure means applies pressure to said piston to move said piston in said pulling direction.

7. A device according to claim 1 wherein
a compressed air connection is selectively in fluid communication with said firing bolt to move said firing bolt into engagement with said striking member to drive the rivet through the workpieces;
a pneumatic/hydraulic pressure connector is selectively in fluid communication with said compressed air connection to supply hydraulic pressure to said piston during pulling of the rivet;
a rapid evacuation valve is selectively in fluid communication with a pneumatic pressure side of said pneumatic/hydraulic converter; and
a pneumatic switch is movable between first, second and third positions selectively connecting said compressed air connection to said firing bold, to said pneumatic/hydraulic pressure converter and to said rapid evacuation valve, respectively.

8. A device according to claim 7 wherein
said pneumatic/hydraulic converter is mounted in a handle or the device.

9. A rivet for use in a device for producing a riveted joint in which the device has means for driving the rivet through workpieces to be joined and has means for pulling the rivet, the rivet comprising:
a rivet jacket;
a rivet pin tightly connected to and received with said rivet jacket;
a pyramid shaped point on a first axial end of said rivet pin facing the workpieces; and
catch means on an exterior surface of said rivet pin and an interior surface of said rivet jacket, said catch means on each of said rivet jacket and said rivet pin including annular surfaces substantially perpendicular to longitudinal axes of said rivet pin and said rivet jacket and angled surfaces extending from said annular surfaces and tapering in a direction away from said first end;
whereby said rivet pin latches to said rivet jacket by engagement of the respective annular surfaces thereof during driving of the rivet through the workpieces.

10. A rivet according to claim 9 wherein
said rivet pin comprises a second axial end opposite said first axial end, said second axial end being tapered.

11. A rivet according to claim 10 wherein
said second axial end is pyramid shaped.

12. A device for producing a riveted joint with a rivet having a rivet jacket and a rivet pin received within the rivet jacket, comprising:
means for driving the rivet through workpieces to be joined including a cylindrical part with a firing channel, including a firing bolt receivable in said firing channel and including a cylindrical striking member arranged between the rivet and said firing bolt and impacted by said firing bolt;
a first flexible element in said cylindrical part biasing said striking member against the rivet pin; and
means for pulling the rivet in the device.

13. A device according to claim 12 wherein
said first flexible element is a helical spring.

14. A device according to claim 12 wherein
said striking member comprises a centering device for the rivet pin on an end of said striking member facing the rivet.

15. A device according to claim 12 wherein
a flexible buffer element is arranged at an end of said cylindrical part facing the rivet to buffer movements of said striking member when the rivet is driven through the workpieces.

16. A device according to claim 12 wherein
said cylindrical part includes a joining member; and
said means for pulling the rivet comprises a clamp sheathing connected to said joining member, clamping jaws surrounded by said joining member and arranged around the rivet pin, a guiding sleeve receiving said clamp sheathing and said joining member, an end piece in an axial end of said guiding sleeve facing the rivet and having a borehole in a center thereof receiving the rivet pin, and a second flexible element biasing said end piece to engage and spread said clamping jaws before and during the rivet being driven through the workpieces.

17. A device according to claim 16 wherein
said cylindrical part comprises a piston coupled to said joining member;
a cylinder is connected to said guiding sleeve, said piston being movable in said cylinder in a pulling direction opposite to a direction of driving the rivet through the workpieces during pulling of the rivet;
a third flexible element biases said piston in a direction opposite to said pulling direction; and
pressure means applies pressure to said piston to move said piston in said pulling direction.

18. A device according to claim 12 wherein
said cylindrical part comprises a piston;
a compressed air connection is selectively in fluid communication with said firing bolt to move said firing bolt into engagement with said striking member to drive the rivet through the workpieces;
a pneumatic/hydraulic pressure connector is selectively in fluid communication with said compressed air connection to supply hydraulic pressure to said piston during pulling of the rivet;

a rapid evacuation valve is selectively in fluid communication with a pneumatic pressure side of said pneumatic/hydraulic converter; and a pneumatic switch is movable between first, second and third positions selectively connecting said compressed air connection to said firing bolt, to said pneumatic/hydraulic pressure converter and to said rapid evacuation valve, respectively.

19. A device according to claim 18 wherein said pneumatic/hydraulic converter is mounted in a handle or the device.

* * * * *